(12) United States Patent
Cao (10) Patent No.: US 10,115,359 B2
(45) Date of Patent: Oct. 30, 2018

(54) DC VOLTAGE CONVERSION CIRCUIT AND LIQUID CRYSTAL DISPLAY DEVICE INCLUDING THE SAME

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 163 days.

(21) Appl. No.: 15/112,654

(22) PCT Filed: Jun. 22, 2016

(86) PCT No.: PCT/CN2016/086784
§ 371 (c)(1),
(2) Date: Jul. 19, 2016

(87) PCT Pub. No.: WO2017/201785
PCT Pub. Date: Nov. 30, 2017

(65) Prior Publication Data
US 2018/0108308 A1    Apr. 19, 2018

(30) Foreign Application Priority Data
May 26, 2016 (CN) .......................... 2016 1 0361516

(51) Int. Cl.
*G09G 3/36* (2006.01)
*H02H 7/12* (2006.01)
(Continued)

(52) U.S. Cl.
CPC ............. *G09G 3/3648* (2013.01); *G09G 3/36* (2013.01); *H02H 7/1213* (2013.01); *H02H 9/04* (2013.01);
(Continued)

(58) Field of Classification Search
CPC ...... G09G 3/3648; H02H 7/1213; H02H 9/04; H02M 3/156
See application file for complete search history.

(56) References Cited

U.S. PATENT DOCUMENTS

2008/0067944 A1    3/2008  Wang et al.
2010/0283539 A1*  11/2010  Yanagisawa ....... G01R 19/2503
                                                                330/127
2015/0277459 A1*  10/2015  Iwasa ........................ G05F 1/56
                                                                345/211

FOREIGN PATENT DOCUMENTS

CN    104682699 A    6/2015
CN    105304050 A    2/2016
(Continued)

*Primary Examiner* — Kevin M Nguyen
(74) *Attorney, Agent, or Firm* — Andrew C. Cheng (57) ABSTRACT

The DC voltage conversion circuit includes a booster circuit and a protection circuit. The booster circuit receives a first voltage, converts the first voltage into a second voltage, and provides the second voltage to a VGH line of a LCD device. The protection circuit includes a detection unit, a current-voltage conversion unit, a comparison unit, and a control unit. The detection unit detects a current flowing between the VGH line and a transmission line and obtains a detection current. The detection current is converted into a detection voltage by the current-voltage conversion unit. The comparison unit compares the detection voltage against a reference voltage. When the detection voltage is greater, the control unit issues a control signal to turn off the booster circuit. The transmission line is one of a VGL line and a VCOM line of the LCD device.

16 Claims, 4 Drawing Sheets

(51) Int. Cl.
*H02H 9/04* (2006.01)
*H02M 3/156* (2006.01)

(52) U.S. Cl.
CPC ...... *H02M 3/156* (2013.01); *G09G 2330/021* (2013.01)

(56) References Cited

FOREIGN PATENT DOCUMENTS

CN     105788560 A    7/2016
JP     2006340587 A   12/2006

\* cited by examiner

DC VOLTAGE CONVERSION CIRCUIT AND LIQUID CRYSTAL DISPLAY DEVICE INCLUDING THE SAME

CROSS REFERENCE

This application claims the priority of Chinese Patent Application No. 201610361516.8, entitled "DC voltage conversion circuit and liquid crystal display device including the same", filed on May 26, 2016, the disclosure of which is incorporated herein by reference in its entirety.

FIELD OF THE INVENTION

The present disclosure relates to display technologies, and more particularly to a DC voltage conversion circuit and a liquid crystal display device employing the DC voltage conversion circuit.

BACKGROUND OF THE INVENTION

Liquid crystal display (LCD) devices are gaining widespread popularity due to their small form factors and low power consumption. A LCD device usually includes a circuit board, a backlight module, and a LCD panel. The circuit board drives the backlight module and the LCD panel. The backlight module provides illumination for the LCD panel. The LCD panel presents texts and images. The circuit board usually includes a DC voltage conversion circuit converting a first voltage into a second voltage, and providing the second voltage to the VGH line of the LCD device's Wire On Array (WOA). Due to various factors (e.g., the conductive particles of the LCD), the VGH line may be short-circuited with the VGL or VCOM line of the WOA. When this happens, current flowing through the VGH line increases, and the layout of the WOA or other components of the LCD device are burnt down.

SUMMARY OF THE INVENTION

The present disclosure teaches a DC voltage conversion circuit for a liquid crystal display (LCD) device, including a booster circuit and a protection circuit. The booster circuit has a booster input terminal and a booster output terminal. The booster input terminal receives a first voltage, and the booster circuit converts the first voltage into a second voltage, and provides the second voltage to a VGH line of the LCD device through the booster output terminal. The protection circuit includes a detection unit, a current-voltage conversion unit, a comparison unit, and a control unit. The detection unit detects a current flowing between the VGH line and a transmission line and obtains a detection current. The detection current is converted into a detection voltage by the current-voltage conversion unit. The comparison unit compares the detection voltage against a reference voltage. When the detection voltage is greater than the reference voltage, the control unit issues a control signal to turn off the booster circuit. The transmission line is one of a VGL line and a VCOM line of the LCD device.

When the transmission line is the VGL line, the detection unit includes a first detection sub-unit. The first detection sub-unit detects the current flowing between the VGH and VGL lines, and obtains the first detection current. The first detection current is converted into the first detection voltage by the current-voltage conversion unit. The comparison unit compares the first detection voltage against the first reference voltage. When the first detection voltage is greater than the first reference voltage, the control unit issues the control signal to turn off the booster circuit.

The first detection sub-unit includes a first resistor and a first thin-film transistor (TFT). The first resistor has an end electrically connected to the VGL line and another end electrically connected to the source of the first TFT whose gate receives a first gate signal and whose drain is electrically connected to the VGH line. When the first gate signal turns on the first TFT, the first detection sub-unit outputs the first detection current.

When the transmission line is the VCOM line, the detection unit includes a second detection sub-unit. The second detection sub-unit detects the current flowing between the VGH and VCOM lines, and obtains the second detection current. The second detection current is converted into the second detection voltage by the current-voltage conversion unit. The comparison unit compares the second detection voltage against the second reference voltage. When the second detection voltage is greater than the second reference voltage, the control unit issues the control signal to turn off the booster circuit. The first and second detection sub-units do not work at the same time.

The second detection sub-unit includes a second resistor and a second thin-film transistor (TFT). The second resistor has an end electrically connected to the VCOM line and another end electrically connected to the source of the second TFT whose gate receives a second gate signal and whose drain is electrically connected to the VGH line. When the second gate signal turns on the second TFT, the second detection sub-unit outputs the second detection current.

The protection circuit further includes a selector having a selection signal input terminal, a first selection signal input terminal, a second selection signal input terminal, and a selection signal output terminal. The selection signal input terminal receives a selection signal. The first selection signal input terminal receives the first reference voltage. The second selection signal input terminal receives the second reference voltage. When the first detection sub-unit works, the selection signal controls the selector to select the first reference voltage and to output the first reference voltage through the selection signal output terminal. When the second detection sub-unit works, the selection signal controls the selector to select the second reference voltage and to output the second reference voltage through the selection signal output terminal.

The current-voltage conversion unit includes a photo coupler, a third resistor, and a fourth resistor. The photo coupler has a first coupling input terminal, a second coupling input terminal, a first coupling output terminal, and a second coupling output terminal. The first coupling input terminal functions as an input terminal for the current-voltage conversion unit and is electrically connected to the booster output terminal. The second coupling input terminal is electrically connected to the VGH line and receives the detection current. The first coupling output terminal is electrically connected to a power source VCC via the third resistor. The second coupling output terminal is electrically connected to ground via the fourth resistor. A junction between the second coupling output terminal and the fourth resistor functions as an output terminal for the current-voltage conversion unit.

The comparison unit includes a comparator whose non-inverting terminal is electrically connected to the second coupling output terminal to receive the detection voltage and whose inverting terminal receives the reference voltage. The comparator compares the detection voltage and the reference voltage. When the detection voltage is greater than the reference voltage, the comparator outputs a first comparison result signal triggering the control unit to issue the control signal.

The control unit includes a fifth resistor and a third thin-film transistor (TFT). The fifth resistor has an end electrically connected to a power source and another end electrically connected the source of the third TFT whose gate is electrically connected to an output terminal of the comparison unit and whose drain is connected to ground. A junction between the fifth resistor and the third TFT functions as an output terminal of the control unit. When the detection voltage is greater than the reference voltage, the third TFT is turned on.

Compared to the prior art, the DC voltage conversion circuit includes the booster circuit and the protection circuit. The booster circuit has the booster input terminal and the booster output terminal. The booster input terminal receives the first voltage. The booster circuit converts the first voltage into the second voltage, and provides the second voltage to the VGH line of the LCD device through the booster output terminal. The protection circuit includes the detection unit, the current-voltage conversion unit, the comparison unit, and the control unit. The detection unit detects the current flowing between the VGH line and the transmission line, and obtains the detection current. The detection current is converted into the detection voltage by the current-voltage conversion unit. The comparison unit compares the detection voltage against the reference voltage. When the detection voltage is greater than the reference voltage, the control unit issues the control signal to turn off the booster circuit. The transmission line is the VGL line or the VCOM line of the LCD device. As described, the DC voltage conversion circuit is capable of turning off the booster circuit when short circuit occurs between the VGH and VGL lines or between the VGH and VCOM lines of the LCD device, thereby preventing the layout or components of the LCD device from being burnt down.

The present disclosure also teaches a LCD device including the above-described DC voltage conversion circuit.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

Embodiments of the present disclosure are described in detail with the technical matters, structural features, achieved objects, and effects with reference to the accompanying drawings as follows. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

Figure 1:
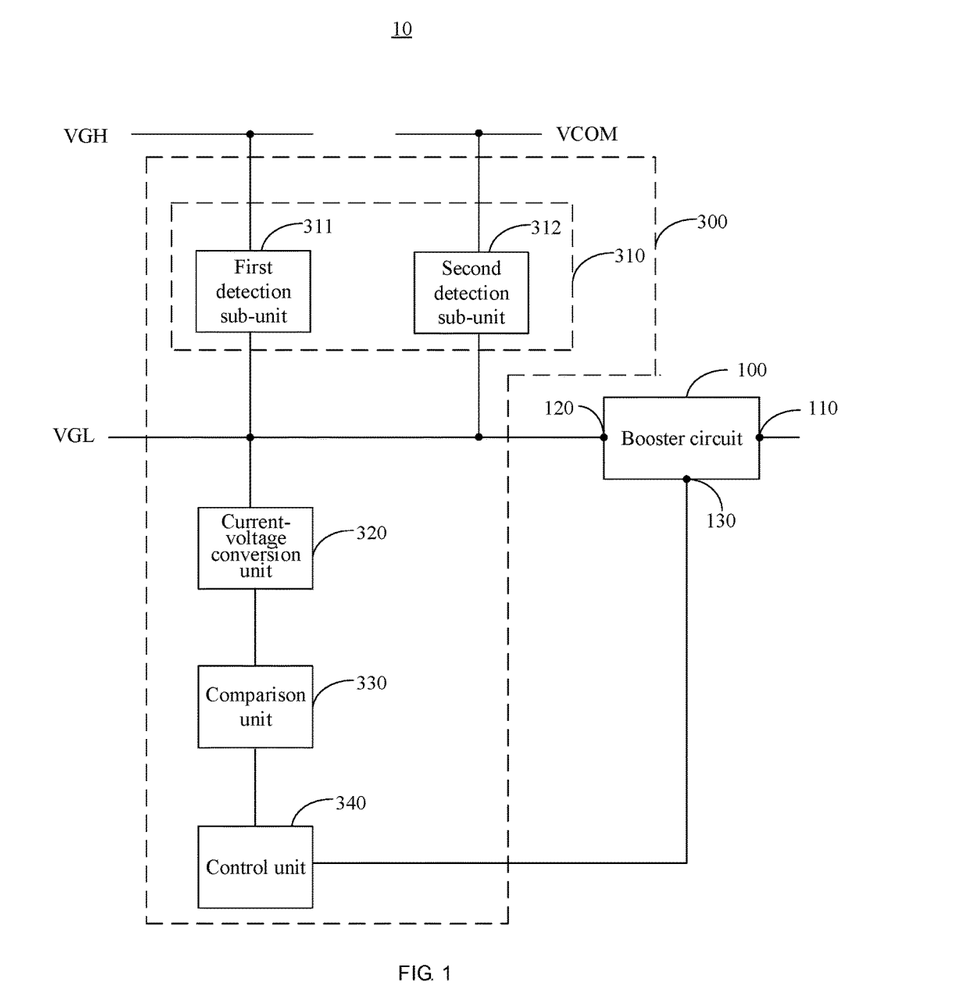
FIG. 1 is a functional block diagram showing a DC voltage conversion circuit according to an embodiment of the present disclosure.
Figure 2:
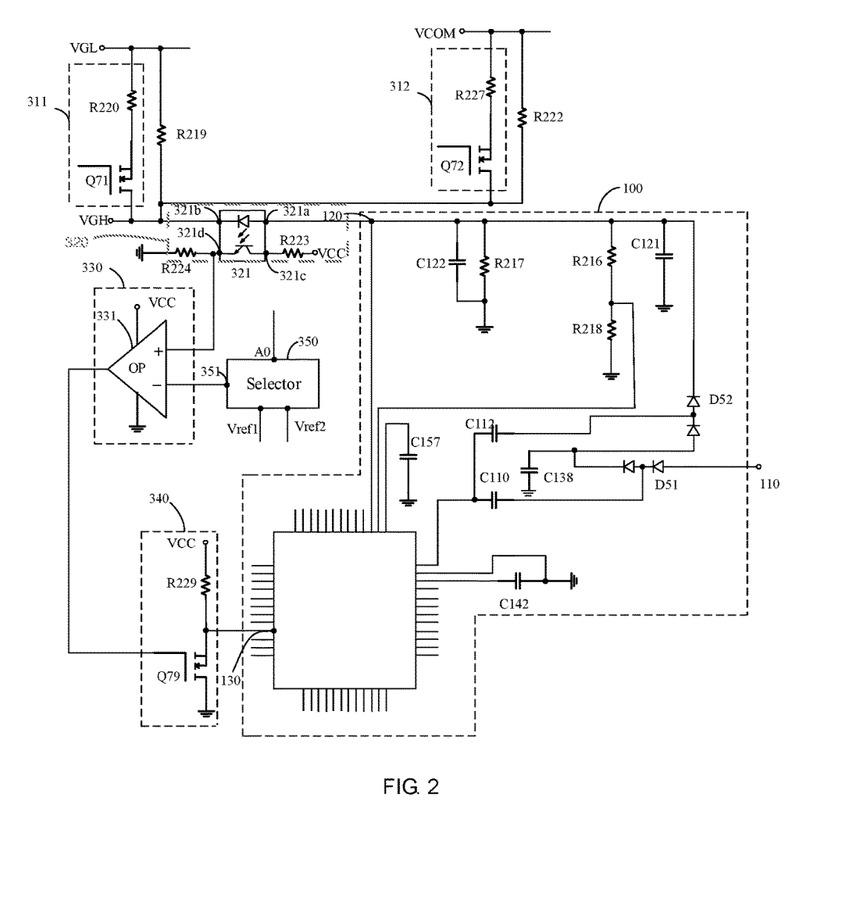
FIG. 2 is a circuit diagram showing the DC voltage conversion circuit of FIG. 1.
Figure 3:
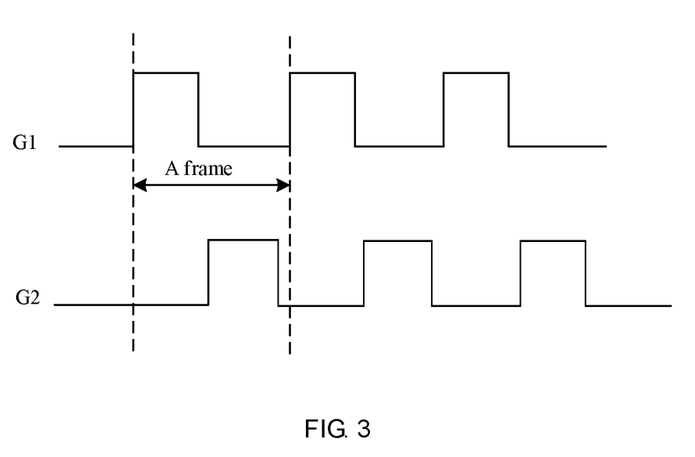
FIG. 3 is a time sequence diagram showing a first gate signal and a second gate signal of the DC voltage conversion circuit of FIG. 1.

FIG. 1 is a functional block diagram showing a DC voltage conversion circuit according to an embodiment of the present disclosure. FIG. 2 is a circuit diagram showing the DC voltage conversion circuit of FIG. 1. FIG. 3 is a time sequence diagram showing a first gate signal and a second gate signal of the DC voltage conversion circuit of FIG. 1. As illustrated in FIGS. 1 to 3, the DC voltage conversion circuit 10 is applied to a liquid crystal display (LCD) device, and the DC voltage conversion circuit 10 includes a booster circuit 100 and a protection circuit 300. The booster circuit 100 has a booster input terminal 110 and a booster output terminal 120. The booster input terminal 110 receives a first voltage. The booster circuit 100 converts the first voltage into a second voltage, and provides the second voltage to a VGH line of the LCD device through the booster output terminal 120. The protection circuit 300 includes a detection unit 310, a current-voltage conversion unit 320, a comparison unit 330, and a control unit 340. The detection unit 310 detects a current flowing between the VGH line and a transmission line, and obtains a detection current. The detection current is converted into a detection voltage by the current-voltage conversion unit 320. The comparison unit 330 compares the detection voltage against a reference voltage. When the detection voltage is greater than the reference voltage, the control unit 340 issues a control signal to turn off the booster circuit 100. The transmission line is a VGL line or a VCOM line of the LCD device. In the present embodiment, the booster circuit 100 further includes a control signal input terminal 130 receiving the control signal.

When the transmission line is the VGL line, the detection unit 310 includes a first detection sub-unit 311. The above-mentioned detection current is referred to as a first detection current, the above-mentioned detection voltage is referred to as the first detection voltage, and the above-mentioned reference voltage is referred to as the first reference voltage. In other words, the first detection sub-unit 311 detects the current flowing between the VGH and VGL lines, and obtains the first detection current. The first detection current is converted into the first detection voltage by the current-voltage conversion unit 320. The comparison unit 330 compares the first detection voltage against the first reference voltage. When the first detection voltage is greater than the first reference voltage, the control unit 340 issues the control signal to turn off the booster circuit 100.

The first detection sub-unit 311 includes a first resistor R220 and a first thin-film transistor (TFT) Q71. The first resistor R220 has an end electrically connected to the VGL line and another end electrically connected to the source of the first TFT Q71 whose gate receives a first gate signal (denoted as G1 in FIG. 3) and whose drain is electrically connected to the VGH line. When the first gate signal turns on the first TFT Q71, the first detection sub-unit 311 outputs the first detection current. The first resistor R220 has a resistance of mega ohm level.

In the present embodiment, the first TFT Q71 is an N-type Metal Oxide Semiconductor (NMOS) TFT. When the first gate signal received by the gate of the first TFT Q71 is at a high level, the first TFT Q71 is turned on. In alternative embodiments, the first TFT Q71 may be a PMOS TFT.

When the first gate signal received by the gate of the first TFT Q71 is at a low level, the first TFT Q71 is turned off.

When the transmission line is the VCOM line, the detection unit 310 includes a second detection sub-unit 312. The above-mentioned detection current is referred to as a second detection current, the above-mentioned detection voltage is referred to as the second detection voltage, and the above-mentioned reference voltage is referred to as the second reference voltage. In other words, the second detection sub-unit 312 detects the current flowing between the VGH and VCOM lines, and obtains the second detection current. The second detection current is converted into the second detection voltage by the current-voltage conversion unit 320. The comparison unit 330 compares the second detection voltage against the second reference voltage. When the second detection voltage is greater than the second reference voltage, the control unit 340 issues the control signal to turn off the booster circuit 100. The first and second detection sub-units 311 and 312 do not work at the same time. In other words, when the second detection sub-unit 312 works, the first detection sub-unit 311 does not work and, when the first detection sub-unit 311 works, the second detection sub-unit 312 does not work. When the first TFT Q71 is turned on, the first detection sub-unit 311 works whereas, when the first TFT Q71 is turned off, the first detection sub-unit 311 does not work.

The second detection sub-unit 312 includes a second resistor R227 and a second thin-film transistor (TFT) Q72. The second resistor R227 has an end electrically connected to the VCOM line and another end electrically connected to the source of the second TFT Q72 whose gate receives a second gate signal (denoted as G2 in FIG. 3) and whose drain is electrically connected to the VGH line. When the second gate signal turns on the second TFT Q72, the second detection sub-unit 312 outputs the second detection current. The second resistor R227 has a resistance of mega ohm level. In the present embodiment, when the second TFT Q72 is turned on, the second detection sub-unit 312 works whereas, when the second TFT Q72 is turned off, the second detection sub-unit 312 does not work.

The protection circuit further includes a selector 350 having a selection signal input terminal A0, a first selection signal input terminal Vref1, a second selection signal input terminal Vref2, and a selection signal output terminal 351. The selection signal input terminal A0 receives a selection signal. The first selection signal input terminal Vref1 receives the first reference voltage, and the second selection signal input terminal Vref2 receives the second reference voltage. When the first detection sub-unit 311 works, the selection signal controls the selector 350 to select the first reference voltage and to output the first reference voltage through the selection signal output terminal 351. When the second detection sub-unit 312 works, the selection signal controls the selector 350 to select the second reference voltage and to output the second reference voltage through the selection signal output terminal 351.

The current-voltage conversion unit 320 includes a photo coupler 321, a third resistor R223, and a fourth resistor R224. The photo coupler 321 has a first coupling input terminal 321a, a second coupling input terminal 321b, a first coupling output terminal 321C, and a second coupling output terminal 321d. The first coupling input terminal 321a functions as an input terminal for the current-voltage conversion unit 320 and is electrically connected to the booster output terminal 120. The second coupling input terminal 321b is electrically connected to the VGH line and receives the detection current. The first coupling output terminal 321c is electrically connected to a power source VCC via the third resistor R223. The second coupling output terminal 321d is electrically connected to ground via the fourth resistor R224. A junction between the second coupling output terminal 321d and the fourth resistor R224 functions as an output terminal for the current-voltage conversion unit 320 and output the detection voltage.

The photo coupler 321 amplifies and optically couples the detection current received by the first and second coupling input terminals 321a and 321b to the first and second coupling output terminals 321c and 321d. The amplified detection current flows through the fourth resistor R224 to obtain the detection voltage. The photo coupler 321 prevents the interference between the electronic components connected with the first and second coupling input terminals 321a and 321b and those connected with the first and second coupling output terminals 321c and 321d, so as to enhance the precision of the protection circuit 300's overcurrent protection.

The comparison unit 330 includes a comparator 331 whose non-inverting terminal is electrically connected to the junction between the second coupling output terminal 321d and the fourth resistor R224 to receive the detection voltage, and whose inverting terminal receives the reference voltage. The comparator 331 compares the detection voltage and the reference voltage. When the detection voltage is greater than the reference voltage, the comparator 331 outputs a first comparison result signal triggering the control unit 340 to issue the control signal.

The control unit 350 includes a fifth resistor R229 and a third TFT Q79. The fifth resistor R229 has an end electrically connected to the power source VCC and another end electrically connected the source of the third TFT Q79 whose gate is electrically connected to an output terminal of the comparison unit 330 and whose drain is connected to ground. A junction between the fifth resistor R229 and the third TFT Q79 functions as an output terminal of the control unit 350. When the detection voltage is greater than the reference voltage, the third TFT Q79 is turned on.

In the present embodiment, the third TFT Q79 is an NMOS TFT. When the gate of the third TFT Q79 receives a high-level signal, the third TFT Q79 is thereby turned on.

The operation of the DC voltage conversion circuit is described as follows. When the LCD device displays each frame of a video or image, the first detection sub-unit 311 conducts a scan of the VGH and VGL lines so as to determine if there is a short circuit therebetween. The second detection sub-unit 312 conducts a scan of the VGH and VCOM lines so as to determine if there is a short circuit therebetween. When the first detection sub-unit 311 scans the VGH and VGL lines, the second detection sub-unit 312 does not scan the VGH and VCOM lines. When the second detection sub-unit 312 scans the VGH and VCOM lines, the first detection sub-unit 311 does not scan the VGH and VGL lines. In the following, it is assumed that the first detection sub-unit 311 scans the VGH and VGL lines first and, when the first detection sub-unit 311 finishes scanning the VGH and VGL lines, the second detection sub-unit 312 scans the VGH and VCOM lines.

When the first detection sub-unit 311 scans the VGH and VGL lines, the first gate signal is applied to the gate of the first TFT Q71. Since the first TFT Q71 is an NMOS TFT in the present embodiment, the first gate signal at a high level turns on the first TFT Q71. The selector 350 outputs the first reference voltage to the comparison unit 330. If there is a short circuit between the VGH and VGL lines (e.g., resulted from conductive particles between the VGH and VGL lines), an equivalent resistor R219 between the VGH and VGL lines has a small resistance (usually of ohm level). The equivalent resistor R219 and the first resistor R220 are parallel-connected, and their joint resistance is small too. At the moment, the first detection current is larger. The first detection voltage obtained by the current-voltage conversion unit 320 according to the first detection current is therefore larger too. When the first detection voltage is greater than the first reference voltage, the comparator 331 outputs a high-level signal. The gate of the third TFT Q79 of the control unit 340 receives the high-level signal from the comparator 331, the third TFT Q79 is turned on, and a low-level signal is output by the third TFT Q79. The low-level signal is applied to the booster circuit 100 to turn off the booster circuit 100.

When there is no short circuit between the VGH and VGL lines, the second detection sub-unit 312 scans the VGH and VCOM lines. The second gate signal is applied to the gate of the second TFT Q72. Since the second TFT Q72 in the present embodiment is an NMOS TFT, the second gate signal at a high level turns on the second TFT Q72. The selector 350 outputs the second reference voltage to the comparison unit 330. If there is a short circuit between the VGH and VCOM lines (e.g., resulted from conductive particles between the VGH and VCOM lines), an equivalent resistor R222 between the VGH and VCOM lines has a small resistance (usually of ohm level). The equivalent resistor R222 and the second resistor R227 are parallel-connected, and their joint resistance is small too. At the moment, the second detection current is larger. The second detection voltage obtained by the current-voltage conversion unit 320 according to the second detection current is therefore larger too. When the second detection voltage is greater than the second reference voltage, the comparator 331 outputs a high-level signal. The gate of the third TFT Q79 of the control unit 340 receives the high-level signal from the comparator 331, the third TFT Q79 is turned on, and a low-level signal is output by the third TFT Q79. The low-level signal is applied to the booster circuit 100 to turn off the booster circuit 100.

In the above example, it is assumed that the first detection sub-unit 311 scans the VGH and VGL lines first and, when the first detection sub-unit 311 finishes scanning the VGH and VGL lines, the second detection sub-unit 312 scans the VGH and VCOM lines. It is understandable that alternative embodiments may have the second detection sub-unit 312 scan the VGL and VCOM lines first and then the first detection sub-unit 311 scans the VGH and VGL lines.

Compared to the prior art, the DC voltage conversion circuit 10 includes the booster circuit 100 and the protection circuit 300. The booster circuit 100 has a booster input terminal 110 and the booster output terminal 120. The booster input terminal 110 receives the first voltage. The booster circuit 100 converts the first voltage into the second voltage, and provides the second voltage to the VGH line of the LCD device through the booster output terminal 120. The protection circuit 300 includes the detection unit 310, the current-voltage conversion unit 320, the comparison unit 330, and the control unit 340. The detection unit 310 detects the current flowing between the VGH line and the transmission line, and obtains the detection current. The detection current is converted into the detection voltage by the current-voltage conversion unit 320. The comparison unit 330 compares the detection voltage against the reference voltage. When the detection voltage is greater than the reference voltage, the control unit 340 issues the control signal to turn off the booster circuit 100. The transmission line is the VGL line or the VCOM line of the LCD device. As described, the DC voltage conversion circuit 10 is capable of turning off the booster circuit 100 when short circuit occurs between the VGH and VGL lines or between the VGH and VCOM lines of the LCD device, thereby preventing the layout or components of the LCD device from being burnt down.

Figure 4:
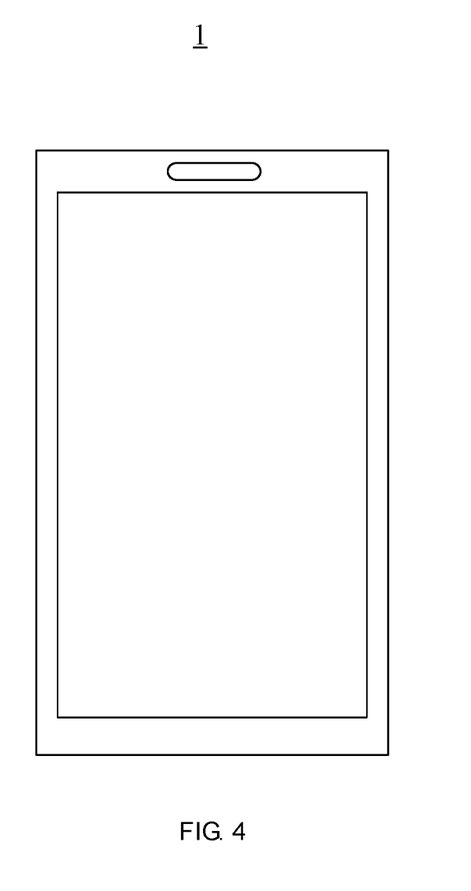
FIG. 4 is a schematic diagram showing the structure of a LCD device according to an embodiment of the present disclosure.

The present disclosure also teaches a LCD device 1 as shown in FIG. 4, which is a schematic diagram showing the structure of the LCD device. The LCD device includes the above-described DC voltage conversion circuit whose details are omitted here. In the present embodiment, the LCD device 1 may be, but not limited to, a smart phone, a mobile internet device (MID), an electronic book reader, a tablet computer, a Play Station Portable (PSP), a Personal Digital Assistance (PDA), etc.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A DC voltage conversion circuit for a liquid crystal display (LCD) device, comprising:
   a booster circuit having a booster input terminal and a booster output terminal, where the booster input terminal receives a first voltage, and the booster circuit converts the first voltage into a second voltage, and provides the second voltage to a VGH line of the LCD device through the booster output terminal; and
   a protection circuit comprising a detection unit, a current-voltage conversion unit, a comparison unit, and a control unit, where the detection unit detects a current flowing between the VGH line and a transmission line and obtains a detection current, the detection current is converted into a detection voltage by the current-voltage conversion unit, the comparison unit compares the detection voltage against a reference voltage, when the detection voltage is greater than the reference voltage, the control unit issues a control signal to turn off the booster circuit, and the transmission line is one of a VGL line and a VCOM line of the LCD device
   wherein when the transmission line is the VGL line, the detection unit comprises a first detection sub-unit; the first detection sub-unit detects the current flowing between the VGH and VGL lines, and obtains the first detection current; the first detection current is converted into the first detection voltage by the current-voltage conversion unit; the comparison unit compares the first detection voltage against the first reference voltage; and, when the first detection voltage is greater than the first reference voltage, the control unit issues the control signal to turn off the booster circuit.

2. The DC voltage conversion circuit according to claim 1, wherein the first detection sub-unit comprises a first resistor and a first thin-film transistor (TFT); the first resistor has an end electrically connected to the VGL line and another end electrically connected to the source of the first TFT whose gate receives a first gate signal and whose drain is electrically connected to the VGH line; and, when the first gate signal turns on the first TFT, the first detection sub-unit outputs the first detection current.

3. The DC voltage conversion circuit according to claim 1, wherein when the transmission line is the VCOM line, detection unit comprises a second detection sub-unit; the second detection sub-unit detects the current flowing between the VGH and VCOM lines, and obtains the second detection current; the second detection current is converted into the second detection voltage by the current-voltage conversion unit; the comparison unit compares the second detection voltage against the second reference voltage; when the second detection voltage is greater than the second reference voltage, the control unit issues the control signal to turn off the booster circuit; and the first and second detection sub-units do not work at the same time.

4. The DC voltage conversion circuit according to claim 3, wherein the second detection sub-unit comprises a second resistor and a second thin-film transistor (TFT); the second resistor has an end electrically connected to the VCOM line and another end electrically connected to the source of the second TFT whose gate receives a second gate signal and whose drain is electrically connected to the VGH line; and, when the second gate signal turns on the second TFT, the second detection sub-unit outputs the second detection current.

5. The DC voltage conversion circuit according to claim 3, wherein the protection circuit further comprises a selector having a selection signal input terminal, a first selection signal input terminal, a second selection signal input terminal, and a selection signal output terminal; the selection signal input terminal receives a selection signal; the first selection signal input terminal receives the first reference voltage, the second selection signal input terminal receives the second reference voltage; when the first detection sub-unit works, the selection signal controls the selector to select the first reference voltage and to output the first reference voltage through the selection signal output terminal; and, when the second detection sub-unit works, the selection signal controls the selector to select the second reference voltage and to output the second reference voltage through the selection signal output terminal.

6. The DC voltage conversion circuit according to claim 1, wherein the current-voltage conversion unit comprises a photo coupler, a third resistor, and a fourth resistor; the photo coupler has a first coupling input terminal, a second coupling input terminal, a first coupling output terminal, and a second coupling output terminal; the first coupling input terminal functions as an input terminal for the current-voltage conversion unit and is electrically connected to the booster output terminal; the second coupling input terminal is electrically connected to the VGH line and receives the detection current; the first coupling output terminal is electrically connected to a power source VCC via the third resistor; the second coupling output terminal is electrically connected to ground via the fourth resistor; and, a junction between the second coupling output terminal and the fourth resistor functions as an output terminal for the current-voltage conversion unit.

7. The DC voltage conversion circuit according to claim 1, wherein the comparison unit comprises a comparator whose non-inverting terminal is electrically connected to the second coupling output terminal to receive the detection voltage and whose inverting terminal receives the reference voltage; the comparator compares the detection voltage and the reference voltage; and, when the detection voltage is greater than the reference voltage, the comparator outputs a first comparison result signal triggering the control unit to issue the control signal.

8. The DC voltage conversion circuit according to claim 1, wherein the control unit comprises a fifth resistor and a third thin-film transistor (TFT); the fifth resistor has an end electrically connected to a power source and another end electrically connected the source of the third TFT whose gate is electrically connected to an output terminal of the comparison unit and whose drain is connected to ground; a junction between the fifth resistor and the third TFT functions as an output terminal of the control unit; and, when the detection voltage is greater than the reference voltage, the third TFT is turned on.

9. A liquid crystal display (LCD) device, comprising a DC voltage conversion circuit, wherein the DC voltage conversion circuit comprises:
a booster circuit having a booster input terminal and a booster output terminal, where the booster input terminal receives a first voltage, and the booster circuit converts the first voltage into a second voltage, and provides the second voltage to a VGH line of the LCD device through the booster output terminal; and
a protection circuit comprising a detection unit, a current-voltage conversion unit, a comparison unit, and a control unit, where the detection unit detects a current flowing between the VGH line and a transmission line and obtains a detection current, the detection current is converted into a detection voltage by the current-voltage conversion unit, the comparison unit compares the detection voltage against a reference voltage, when the detection voltage is greater than the reference voltage, the control unit issues a control signal to turn off the booster circuit, and the transmission line is one of a VGL line and a VCOM line of the LCD device;
wherein when the transmission line is the VGL line, the detection unit comprises a first detection sub-unit; the first detection sub-unit detects the current flowing between the VGH and VGL lines, and obtains the first detection current; the first detection current is converted into the first detection voltage by the current-voltage conversion unit; the comparison unit compares the first detection voltage against the first reference voltage; and, when the first detection voltage is greater than the first reference voltage, the control unit issues the control signal to turn off the booster circuit.

10. The LCD device according to claim 9, wherein the first detection sub-unit comprises a first resistor and a first thin-film transistor (TFT); the first resistor has an end electrically connected to the VGL line and another end electrically connected to the source of the first TFT whose gate receives a first gate signal and whose drain is electrically connected to the VGH line; and, when the first gate signal turns on the first TFT, the first detection sub-unit outputs the first detection current.

11. The LCD device according to claim 9, wherein when the transmission line is the VCOM line, the detection unit comprises a second detection sub-unit; the second detection sub-unit detects the current flowing between the VGH and VCOM lines, and obtains the second detection current; the second detection current is converted into the second detection voltage by the current-voltage conversion unit; the comparison unit compares the second detection voltage against the second reference voltage; when the second detection voltage is greater than the second reference voltage, the control unit issues the control signal to turn off the booster circuit; and the first and second detection sub-units do not work at the same time.

12. The LCD device according to claim 11, wherein the second detection sub-unit comprises a second resistor and a second thin-film transistor (TFT); the second resistor has an end electrically connected to the VCOM line and another end electrically connected to the source of the second TFT whose gate receives a second gate signal and whose drain is electrically connected to the VGH line; and, when the second gate signal turns on the second TFT, the second detection sub-unit outputs the second detection current.

13. The LCD device according to claim 11, wherein the protection circuit further comprises a selector having a selection signal input terminal, a first selection signal input terminal, a second selection signal input terminal, and a selection signal output terminal; the selection signal input terminal receives a selection signal; the first selection signal input terminal receives the first reference voltage, the second selection signal input terminal receives the second reference voltage; when the first detection sub-unit works, the selection signal controls the selector to select the first reference voltage and to output the first reference voltage through the selection signal output terminal; and, when the second detection sub-unit works, the selection signal controls the selector to select the second reference voltage and to output the second reference voltage through the selection signal output terminal.

14. The LCD device according to claim 9, wherein the current-voltage conversion unit comprises a photo coupler, a third resistor, and a fourth resistor; the photo coupler has a first coupling input terminal, a second coupling input terminal, a first coupling output terminal, and a second coupling output terminal; the first coupling input terminal functions as an input terminal for the current-voltage conversion unit and is electrically connected to the booster output terminal; the second coupling input terminal is electrically connected to the VGH line and receives the detection current; the first coupling output terminal is electrically connected to a power source VCC via the third resistor; the second coupling output terminal is electrically connected to ground via the fourth resistor; and, a junction between the second coupling output terminal and the fourth resistor functions as an output terminal for the current-voltage conversion unit.

15. The LCD device according to claim 9, wherein the comparison unit comprises a comparator whose non-inverting terminal is electrically connected to the second coupling output terminal to receive the detection voltage and whose inverting terminal receives the reference voltage; the comparator compares the detection voltage and the reference voltage; and, when the detection voltage is greater than the reference voltage, the comparator outputs a first comparison result signal triggering the control unit to issue the control signal.

16. The LCD device according to claim 9, wherein the control unit comprises a fifth resistor and a third thin-film transistor (TFT); the fifth resistor has an end electrically connected to a power source and another end electrically connected the source of the third TFT whose gate is electrically connected to an output terminal of the comparison unit and whose drain is connected to ground; a junction between the fifth resistor and the third TFT functions as an output terminal of the control unit; and, when the detection voltage is greater than the reference voltage, the third TFT is turned on.

\* \* \* \* \*